US012077181B1

(12) United States Patent
Costantino et al.

(10) Patent No.: US 12,077,181 B1
(45) Date of Patent: Sep. 3, 2024

(54) VEHICLE CONTROL USING CONTEXT-SENSITIVE TRAJECTORY GENERATION

(71) Applicant: Zoox, Inc., Foster City, CA (US)

(72) Inventors: Adrian Michael Costantino, Foster City, CA (US); Marin Kobilarov, Baltimore, MD (US); Mark Jonathon McClelland, San Francisco, CA (US); Yunpeng Pan, Newark, CA (US)

(73) Assignee: Zoox, Inc., Foster City, CA (US)

( * ) Notice: Subject to any disclaimer, the term of this patent is extended or adjusted under 35 U.S.C. 154(b) by 427 days.

(21) Appl. No.: 17/491,483

(22) Filed: Sep. 30, 2021

(51) Int. Cl.
*B60W 60/00* (2020.01)

(52) U.S. Cl.
CPC ..... *B60W 60/0011* (2020.02); *B60W 2552/30* (2020.02); *B60W 2720/10* (2013.01); *B60W 2720/106* (2013.01); *B60W 2720/12* (2013.01); *B60W 2720/125* (2013.01); *B60W 2720/24* (2013.01)

(58) Field of Classification Search
None
See application file for complete search history.

(56) References Cited

U.S. PATENT DOCUMENTS

| | | | | |
|---|---|---|---|---|
| 2017/0369059 | A1* | 12/2017 | Schuberth | B60W 30/143 |
| 2018/0292834 | A1* | 10/2018 | Kindo | B60W 60/0053 |
| 2019/0126928 | A1* | 5/2019 | Sakaguchi | B60W 10/06 |
| 2021/0114617 | A1* | 4/2021 | Phillips | B60W 30/0956 |
| 2021/0206397 | A1* | 7/2021 | Jiang | B60W 30/18163 |
| 2021/0271245 | A1* | 9/2021 | Bradley | G05D 1/0212 |
| 2021/0403032 | A1* | 12/2021 | Jing | H04W 4/026 |
| 2022/0083065 | A1* | 3/2022 | Liu | G01C 21/26 |
| 2022/0169281 | A1* | 6/2022 | Lin | G06V 20/588 |
| 2022/0176995 | A1* | 6/2022 | Subramanian | B60W 30/08 |
| 2022/0212693 | A1* | 7/2022 | Fang | B60W 60/0011 |
| 2022/0219728 | A1* | 7/2022 | Ahmed | B60W 40/072 |
| 2022/0289189 | A1* | 9/2022 | Komuro | G01S 13/867 |
| 2023/0161353 | A1* | 5/2023 | Liu | B60W 60/001 |
| | | | | 701/25 |

* cited by examiner

*Primary Examiner* — Amelia Vorce
(74) *Attorney, Agent, or Firm* — Lee & Hayes, P.C.

(57) ABSTRACT

Controlling motion of an autonomous vehicle may comprise determining a state space representation of the environment associated with the autonomous vehicle based at least in part on sensor data. The autonomous vehicle may parameterize the state space according to arc length and lateral distance from a route reference. The autonomous vehicle may determine a state in the state space upon which to base trajectory generation (e.g., via a tree search, via a state space sampling technique based on cost) and may determine a set of control instructions (i.e., a trajectory) that would bring the autonomous vehicle to the arc length and lateral distance specified by the state. Determining the state for generating the trajectory may be based on a heuristic for determining approximately where the trajectory would bring the vehicle, since the arc length parameterized state space doesn't include an indication of location.

20 Claims, 6 Drawing Sheets

VEHICLE CONTROL USING CONTEXT-SENSITIVE TRAJECTORY GENERATION

BACKGROUND

Planning systems in vehicles, such as autonomous vehicles, may use information associated with objects in an environment and attributes of the environment to determine actions for navigating the vehicle through the environment. A vehicle control system may alter the vehicle's speed or heading to accomplish a mission, such as dropping off or picking up a passenger, and/or to take into account an object or environmental conditions that encroaches on the vehicle's path to complete such a mission. Accounting for objects and environmental conditions and accurately controlling the vehicle's response is important for safety and effective vehicle navigation—vehicle movement that doesn't unjustifiably stop, stutter, or take excursions. However, the planning system may handle some conditions less well than others, which may decrease the safety and/or efficiency of the vehicle in navigating an environment.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Figure 1:
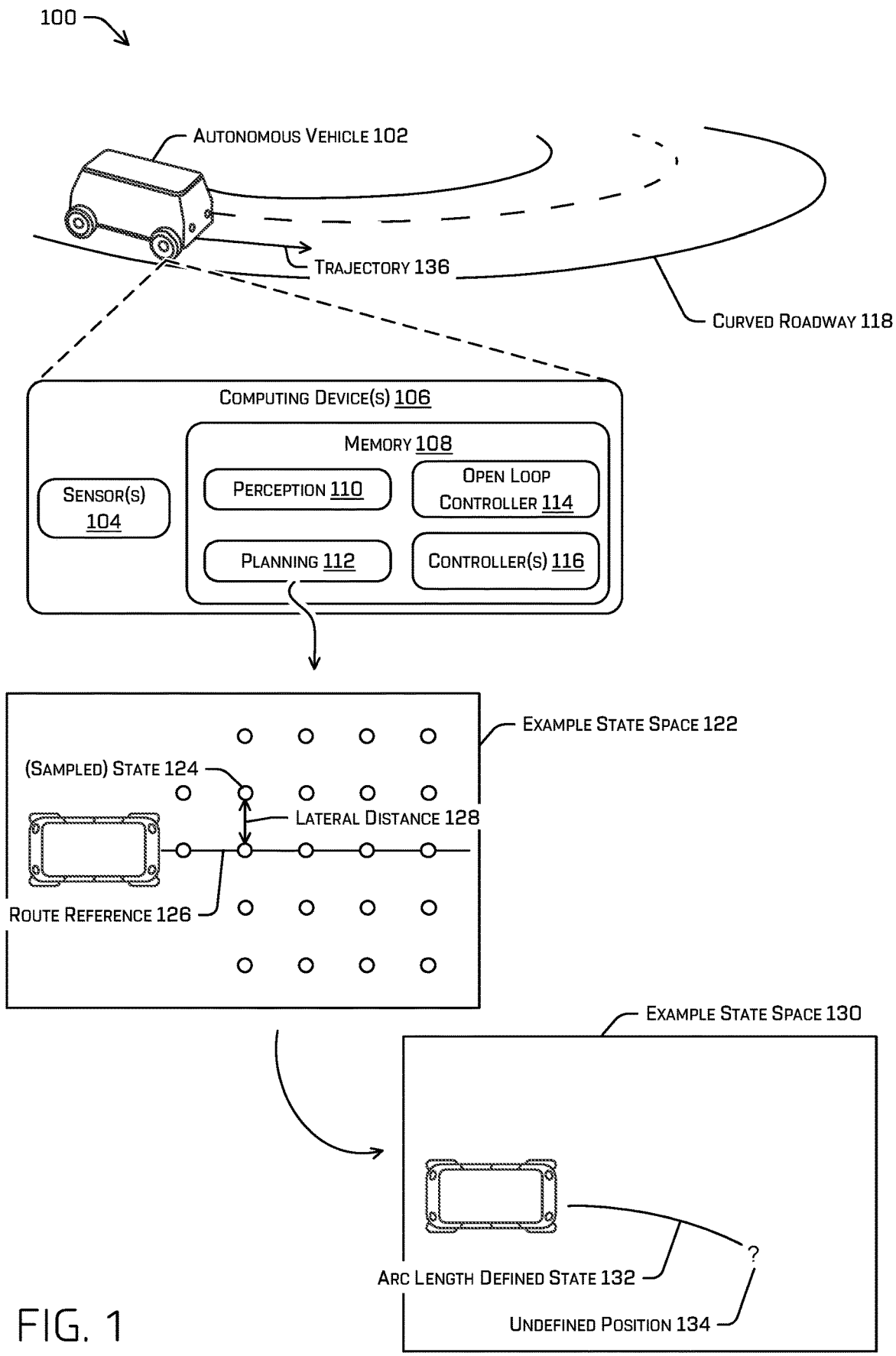
FIG. 1 illustrates an autonomous vehicle and an example scenario in which an autonomous vehicle alters how a planning component of the autonomous vehicle generates trajectories for controlling the vehicle based on a condition detected by the autonomous vehicle.

As discussed above, correctly detecting what is in an environment and determining a best action to take is important for safely and efficiently navigating an autonomous vehicle through the environment. Issues with systems that control these functions may cause the autonomous vehicle to stutter or hesitate, stop when a human driver would be able to navigate a situation, need to transmit a request for help from a remote operator (or "teleoperator"), move in a manner that may be uncomfortable or unusual compared to a human driver (e.g., quicker accelerations, more aggressive steering), and/or cause a safety issue. This application relates to techniques for increasing the smoothness of the operation of an autonomous vehicle. The techniques discussed herein may increase passenger comfort by reducing acceleration and/or jerk, particularly when the autonomous vehicle is operating on a curved portion of roadway or at low speeds.

For example, an autonomous vehicle may determine a trajectory for controlling the autonomous vehicle based at least in part on sampling a state space parameterized according to a lateral distance from a route reference and progress along the route reference. The route reference may be a line or curve that may be determined based at least in part on map data. For example, the line may correspond with a center of a lane when a roadway is straight, but may be biased towards an inside or outside of the lane when the roadway is curved, a pedestrian or cyclist is present, traffic is heavier, or the like, any of which may be determined by a perception component of the autonomous vehicle or may be determined from map data stored on the autonomous vehicle or streamed from a remote computing device. Sampling a state space may include determining, at regular or random intervals, various points in the state space. The state space itself may be a range of possible states of the vehicle. For example, a particular point in the state space may indicate a vehicle position, heading, and/or velocity. Parameterizing the state space according to a lateral distance and progress (e.g., displacement) means that a particular point in the state space may further indicate a lateral distance from and/or displacement along the route reference. Determining a trajectory to control the vehicle may include determining a steering rate, curvature, acceleration, and/or velocity with which to control the vehicle to accomplish the state indicated by the particular point in the state space, i.e., a steering rate, curvature, acceleration, and/or velocity that will cause the vehicle to arrive at a state indicated by the point in the state space, such as a position, heading, velocity, acceleration, lateral distance from the route reference, and/or displacement along the route reference.

The techniques discussed herein include using sensor data to detect whether a condition has been met to alter the trajectory generation method from the method described above (or any other) to a trajectory generation technique that is based on parameterizing the state space according to arc length and/or a derivative of arc length. For example, detecting whether the condition has been met may include determining whether a first trajectory generated by the vehicle and/or a roadway are associated with a curvature that meets or exceeds a threshold curvature, whether a passenger is present in the autonomous vehicle, map data, a path or route determined by the vehicle, and/or an accelerometer measurement (e.g., a lateral acceleration and/or jerk measured by the accelerometer). In some examples, the state space parameterized based on arc length may additionally be parameterized based on lateral distance from a route reference and/or derivative(s) of the lateral distance. The first trajectory may be one that is determined based at least in part on a state space parameterized according to lateral distance and/or a displacement, as discussed above. If the condition is met (e.g., a passenger is present; map data, a path or route, or the first trajectory include a portion that is associated with a curvature that meets or exceeds a threshold curvature), the techniques discussed herein may include altering a trajectory generation component of the vehicle to use an alternate trajectory generation method.

According to the alternate technique, the vehicle may parameterize the state space according to arc length and/or a derivative of arc length. Such a state space may indicate an arc length, derivative of arc length, angle, curvature, velocity, and/or acceleration, but may lack an indication of position and/or heading, in some examples. In such an example, the vehicle may determine a second trajectory (e.g., which may comprise controls for actuating drive components of the vehicle to accomplish a steering rate, steering heading, acceleration, and/or velocity) suitable to accomplish an arc length, derivative of arc length, angle, curvature, velocity, and/or acceleration indicated by point in the arc length parameterized state space.

Since a state (i.e., a particular point) in an arc length parameterized space may not indicate a position in the environment, unlike the lateral distance/displacement parameterized space, the position accomplished by a trajectory determined to accomplish the state will be unknown. However, the techniques may include using a heuristic to determine an estimated position (or estimated region) that would result from implementing a trajectory using a particular state in the arc length parameterized space so that a planning component of the vehicle may determine, before generating a trajectory, an estimate of whether the trajectory is suitable for controlling the vehicle. For example, the planning component may use an estimated position and/or region to preliminarily determine whether a trajectory would result in an impact with an object or violate an operating parameter associated with the vehicle, such as a rule that dictates how close the vehicle may pass by objects of a certain kind, whether the vehicle may cross into another lane, or the like. This estimated position may be used as a substitute or proxy for position in a tree search or other state space exploration technique for determining a path and/or which trajectory(ies) to use to control a vehicle, such as is described in U.S. patent application Ser. No. 17/394,334, filed Aug. 4, 2021, the entirety of which is incorporated herein. Determining the estimate using a heuristic may include treating the trajectory that would be generated based on an arc length as a straight line and solving the Pythagorean theorem for displacement (e.g., where the arc length is treated as the distance of the hypotenuse, a lateral distance may be known since the arc length trajectory may additionally parameterized based on a lateral distance from a reference—this lateral distance may be treated as a leg, and the displacement along the route may be treated as the length of the other leg and may be the term solved for).

Regardless, once the trajectory generation component determines a trajectory based on a state indicated in the state space, i.e., a trajectory sufficient to cause the vehicle to traverse the environment to reach an arc length, derivative of arc length, acceleration, velocity, curvature, and/or angle, the trajectory generation component may determine the position that would be accomplished by such a trajectory. For example, determining the final position that would be accomplished by an arc length parameterized trajectory may include determining an integral of the derivative(s) of arc length. This final position may be used by the planning component of the autonomous vehicle to determine whether or not to use the trajectory. In some instances, the planning component may determine that the final position and/or an intermediate position along the trajectory would violate an operating parameter and may re-select a new state in the state space from which to determine a trajectory. In some examples, an intermediate position along the trajectory may be determined once the trajectory is generated.

In general, trajectories determined according to the alternate technique using the arc length parameterized state space will result in acceleration(s) that are more comfortable to a passenger than acceleration(s) of trajectories determined according to a lateral distance/displacement parameterized state space. For example, the arc length parameterized trajectories may result in a lower jerk and/or lateral acceleration on curved roadways or turns in comparison to lateral distance/displacement parameterized trajectories determined for the same roadway and/or turns. The arc length parameterized trajectories thereby increase ride comfort of the autonomous vehicle and may more closely imitate a human driving experience.

The techniques discussed herein may additionally or alternatively comprise determining to alter functionality of the trajectory generation component to use an open loop control for trajectories associated with a velocity below a velocity threshold (e.g., below 2 miles per hour, 1 mile per hour) instead of closed loop control. In such an instance, the trajectory generated according to the open loop control technique may have a constant steering rate and may be a "start" trajectory to bring the autonomous vehicle from a stand still into motion or a "stop" trajectory to bring the autonomous vehicle to a stop. Although the open loop control may not guarantee a particular stop time (as opposed to closed loop control), the open loop control may bring the vehicle to a more fluid stop or start motion of the vehicle more fluidly. This technique may avoid instances where the autonomous vehicle behaves erratically while slowing to a stop or starting to move from a stand still.

Example Scenario

FIG. 1 illustrates an example scenario 100 including a vehicle 102. In some examples, the example scenario 100 may be a real-world scenario and/or the example scenario 100 may be a representation of a real-world scenario modeled as a simulated scenario. In examples where the example scenario 100 is a simulated scenario, the example scenario 100 may be determined based at least in part on input received at a user interface of a computing device (e.g., a user of the computing device may define the environment, objects therein, and/or characteristics thereof) and/or the example scenario 100 may be based at least in part on log data received from one or more autonomous vehicles. The log data may be based at least in part on sensor data received at an autonomous vehicle, perception data generated by a perception component, and/or instructions generated by a planning component. In some examples, the autonomous vehicle may store the log data and/or periodically transmit the log data to a remote computing device.

In some instances, the vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 102 may be a fully or partially autonomous vehicle having any other level or classification. It is contemplated that the techniques discussed herein may apply to more than robotic control, such as for autonomous vehicles. For example, the techniques discussed herein may be applied to mining, manufacturing, augmented reality, etc. Moreover, even though the vehicle 102 is depicted as a land vehicle, vehicle 102 may be a spacecraft, watercraft, and/or the like. In some examples, vehicle 102 may be represented in a simulation as a simulated vehicle. For simplicity, the discussion herein does not distinguish between a simulated vehicle and a real-world vehicle. References to a "vehicle" may therefore reference a simulated and/or a real-world vehicle.

According to the techniques discussed herein and an example where scenario 100 is a real-world example (or is based on a real world scenario, such as by being based on log data), the vehicle 102 may receive sensor data from sensor(s) 104 of the vehicle 102. For example, the sensor(s) 104 may include a location sensor (e.g., a global positioning system (GPS) sensor), an inertia sensor (e.g., an accelerometer sensor, a gyroscope sensor, etc.), a magnetic field sensor (e.g., a compass), a position/velocity/acceleration sensor (e.g., a speedometer, a drive system sensor), a depth position sensor (e.g., a lidar sensor, a radar sensor, a sonar sensor, a time of flight (ToF) camera, a depth camera, and/or other depth-sensing sensor), an image sensor (e.g., a camera), an audio sensor (e.g., a microphone), and/or environmental sensor (e.g., a barometer, a hygrometer, etc.). In some examples, a simulated sensor may correspond with at least one of the sensor(s) 104 on the vehicle 102 and in a simulation, one or more of sensor(s) 104 may be simulated. In some examples, the position of a simulated sensor may correspond with a relative position of one of the sensor(s) 104 to the vehicle 102.

The sensor(s) 104 may generate sensor data, which may be received by computing device(s) 106 associated with the vehicle 102. However, in other examples, some or all of the sensor(s) 104 and/or computing device(s) 106 may be separate from and/or disposed remotely from the vehicle 102 and data capture, processing, commands, and/or controls may be communicated to/from the vehicle 102 by one or more remote computing devices via wired and/or wireless networks.

Computing device(s) 106 may comprise a memory 108 storing a perception component 110, a planning component 112, open loop controller 114, and/or controller(s) 116. In some examples, the planning component 112 may comprise the open loop controller 114. The perception component 110 and/or the planning component 112 may include one or more machine-learned (ML) models and/or other computer-executable instructions. In some examples, the controller(s) 116 may include instructions stored in a memory, although the controller(s) 116 may additionally or alternatively include a specialized computing device that comprises hardware and/or software for actuating drive components of the vehicle 102.

In general, the perception component 110 may determine what is in the environment surrounding the vehicle 102 and the planning component 112 may determine how to operate the vehicle 102 according to information received from the perception component 110. The perception component 110 may generate perception data, which may comprise data associated with static objects in the environment (static data) and/or data associated with dynamic objects in the environment (dynamic data). For example, the static data may indicate a likelihood that an object exists at a location in the environment and the dynamic data may indicate a likelihood that an object occupies or will occupy a location in the environment. In some instances, the dynamic data may comprise multiple frames associated with different times steps at intervals up to a prediction horizon (i.e., a maximum time/distance for which dynamic data is predicted). For example, the dynamic data may indicate a current position, heading, velocity, and/or the like associated with a dynamic object and at one or more future times.

The planning component 112 may additionally or alternatively comprise a prediction component that determines an estimate of a future action and/or movement (i.e., a prediction) that a dynamic object may take. In some examples, the prediction may be based at least in part on a mode of operation and/or trajectory of the vehicle. For example, the dynamic data may comprise a first prediction associated with a first vehicle mode and a first time and a second prediction associated with a second vehicle mode and the first time. The vehicle modes may include mission-level modes, such as passenger pickup, passenger transit, passenger drop-off, or the like; path or trajectory-level modes such as maintaining trajectory, slowing to a stop, transitioning lanes, executing a righthand turn, or the like; and/or signal modes, such as activating a speaker, activating a turn light, flashing headlights or high beams, or the like. The autonomous vehicle's behavior and signals may affect decisions and behavior made by other entities in the vicinity of the autonomous vehicle 102 and may thereby affect the predicted motion of other objects.

In some examples, the perception component 110 may receive sensor data from the sensor(s) 104 and determine data related to objects in the vicinity of the vehicle 102 (perception data), such as the static and/or dynamic data, which may include prediction data related thereto. The perception data may include the static and/or dynamic data, a heat map (which may indicate a confidence indicating that a classification is correct and/or an indication that an object or object of a specific classification is occupying or will occupy a discrete portion of the environment, for example), object classifications associated with detected objects, instance segmentation(s), semantic segmentation(s), two and/or three-dimensional bounding boxes, tracks, etc. The perception component 110 may additionally or alternatively determine route data that specifies a destination of the vehicle (although, in some examples, a route may be received from the planning component based at least in part on receiving a start and/or end position of the route), global map data that identifies characteristics of roadways (e.g., features detectable in different sensor modalities useful for localizing the autonomous vehicle), local map data that identifies characteristics detected in proximity to the vehicle (e.g., locations and/or dimensions of buildings, trees, fences, fire hydrants, stop signs, and any other feature detectable in various sensor modalities), track data (e.g., the environment representations, object detections, and/or tracks discussed herein), etc. In some examples, the perception component 110 may determine a curvature of the roadway based at least in part on sensor data, such as image data, depth data (e.g., lidar, ToF, radar, sonar), and/or the like. For example, the perception component 110 may additionally or alternatively determine that a curvature associated with a roadway meets or exceeds a threshold curvature, such as curved roadway 118. In some examples, the curvature may be determined and/or affirmed based at least in part on map data stored in the memory 108 and a position of the vehicle 102 in the environment, as determined based at least in part on sensor data (e.g., using GPS) and/or based at least in part on output of a localization component of the perception component 110, which may determine a local position and/or orientation of the vehicle 102 using a simultaneous localization and mapping (SLAM) technique that is based at least in part on the sensor data.

In some examples, the perception component 110 may comprise a pipeline of hardware and/or software, which may include one or more GPU(s), ML model(s), Kalman filter(s), and/or the like. In some examples, the perception component 110 may monitor as much of the environment surrounding the autonomous vehicle as possible, which may be limited by sensor capabilities, object and/or environmental occlusions (e.g., buildings, elevation changes, objects in front of other objects), and/or environmental effects such as fog, snow, and/or the like. The perception component 110 may be configured to detect as many objects and information about the environment as possible to avoid failing to account for an event or object behavior that should be taken into account by the planning component 112 in determining a trajectory for controlling motion of the vehicle.

The object classifications, which may be part of the perception data determined by the perception component 110, may distinguish between different object types such as, for example, a passenger vehicle, a pedestrian, a bicyclist, a delivery truck, a semi-truck, traffic signage, and/or the like. A track may comprise a historical, current, and/or predicted object position, velocity, acceleration, and/or heading. In some examples, the perception component 110 may comprise a prediction component that may determine the predicted portion of the track, which may comprise a predicted position, heading, steering rate, velocity, acceleration, classification (for those classifications that are malleable, such as cyclists that may become pedestrians), etc. The prediction component may comprise a simulation component, machine-learned model, or in additional or alternate examples, the prediction component may comprise a Kalman filter or the like. The perception component 110 may be used to determine the prediction, which may be part of the perception data.

The data produced by the perception component 110 may be collectively referred to as perception data. Once/as the perception component 110 generates perception data, the perception component 110 may provide the perception data to the planning component 112. In some examples, perception data may comprise outputs of sensor specific pipelines (e.g., vision, lidar, radar) and/or hybrid sensor pipelines (e.g. vision-lidar, radar-lidar).

The planning component 112 may use the perception data received from perception component 110, to determine one or more trajectories, control motion of the vehicle 102 to traverse a path or route, and/or otherwise control operation of the vehicle 102, though any such operation may be performed in various other components (e.g., localization may be performed by a localization component, which may be based at least in part on perception data). For example, the planning component 112 may determine a route for the vehicle 102 from a first location to a second location, which may be based at least in part on a mission and map data, in at least one example. For a mission that includes picking up a passenger at one location and dropping the passenger off at another location (potentially with intervening waypoints), the planning component may determine a route that specifies the roadways or roadway portions to accomplish the mission.

The planning component may determine, based at least in part on perception data and/or the route, a plurality of candidate trajectories for controlling motion of the vehicle 102 in accordance with a receding horizon technique (e.g., 1 micro-second, half a second, 2 seconds, 5 seconds, 10 seconds, or any other near-term time period) to control the vehicle to traverse the route (e.g., in order to avoid any of the detected objects); and select one of the candidate trajectories as a trajectory 120 that may be used to generate a drive control signal that may be transmitted to the controller(s) 116 for actuating drive components of the vehicle 102. In order to generate such a trajectory 120, the perception component may determine a state space based at least in part on the perception data. The state space may identify potential future states of the vehicle 102 and may be associated with the time horizon. In other words, a specific state within the state space may identify a potential state of the vehicle 102 at a time equal to the time horizon (e.g., 0.5 seconds in the future, 1 second in the future, or the like).

The planning component 112 may use the prediction data to limit/bound the state space based at least in part on rule set (operating parameters), such as making unavailable any position in the environment indicated as being occupied or being associated with a likelihood of being occupied above a threshold likelihood, making unavailable a portion of the environment that is within a buffer distance of an object or a roadway edge (e.g., as discussed in more detail in U.S. patent application Ser. No. 16/389,858, filed Apr. 19, 2019, limiting a maximum velocity to a legal limit and/or a legal limit adjusted downwards based at least in part on perception data indicating a weather condition or traffic complexity (see U.S. patent application Ser. No. 17/184,559, filed Feb. 24, 2021, a minimum velocity based at least in part on perception data indicate a speed of surrounding traffic, steering rate limits, comfort limits (e.g., acceleration and/or jerk limits), and/or the like.

In some examples, the planning component 112 may parameterize the state space according to different techniques. For example, nominal operation of the planning component 112 may comprise parameterizing the state space according to lateral distance from and/or displacement along a route reference. FIG. 1 depicts an example state space 122 parameterized according to lateral distance and displacement. The depicted state space has been sampled at regular intervals in lateral distance (e.g., lateral distance 128) and in displacement. Of course, though depicted as two-dimensional for illustrative purposes, the description isn't meant to be so limiting. For any one or more of the discretized points there may be a plurality of further discretized states associated. As a non-limiting example, a point of the example state space 122 may be associated with a number of states having differing velocities and/or heading (or yaw/orientation) angles. A route reference may be a lane reference, which may indicate a position within a lane. On straight roadways this position may be the center, although if a bike lane, construction, sidewalk, or object is detected (by the perception component 110) as being present, the reference may be shifted away from such a feature. These samples are depicted as circles. On curved roadways, a lane reference may be biased towards an inside of the lane/curve, although in other examples the lane may be biased to the outside. The depicted example includes a route reference 126 that is depicted as being straight for simplicity.

Regardless, the planning component 112 may determine candidate trajectory(ies) 120 based at least in part on the example state space 122, which may comprise determining vehicles controls sufficient to bring the vehicle 102 to the state indicated by a particular state, such as state 124. For example, if state 124 was selected for a candidate trajectory to be determined in association therewith, the planning component 112 may determine controls, which may include a steering heading, steering rate, velocity, and/or acceleration to apply to one or more wheels of the vehicle 102 sufficient to bring the vehicle 102 to the state 124 at the time associated therewith. In such an example, since example state space 122 is parameterized according to lateral distance from and displacement along the route reference 126, the controls would be generated to bring the vehicle 102 to a lateral distance 128 from the route reference 126 at a displacement along the route reference 126 (i.e., a distance along the route reference from a starting position of the vehicle to a point associated with the end point indicated by the state 124—the point may be projected onto the route reference to determine the displacement) at a time associated with the state and/or state space, which may be a horizon time or the end of an intermediate time interval, in at least one example. For example, although a horizon time may be 5 seconds, the planning component 112 may determine trajectories for controlling the vehicle 102 over smaller intermediate time intervals from a present time up until the horizon time, such as 0.5 second intervals, 100 millisecond intervals, 1 second intervals, or the like.

According to the techniques discussed herein, if the vehicle detects, e.g., via perception data, that a condition is satisfied (as discussed in more detail according to example process 500), the vehicle may alter the planning component 112 to generate trajectories differently by altering the manner in which the planning component 112 parameterizes the state space. The condition may be associated with a curvature of a trajectory generated according to a different state space parameterization, a curvature of a roadway, a number or existence of passengers in the vehicle 102, weather and/or traffic conditions, and/or the like. In some examples, the techniques discussed herein include parameterizing a state space according to arc length and/or derivative(s) thereof. For example, an example state space 130 is depicted that includes a single state parameterized according to arc length 132. Note that, unlike a state space parameterized according to lateral distance/displacement or according to position, the example state space 130 does not indicate a position the vehicle will arrive at. Hence, FIG. 1 depicts the state as an arc length terminating at an undefined position 134. The planning component may then use the arc length to determine a trajectory specifying controls to accomplish the arc length (and its derivative(s) in some examples). In some examples, the state space 130 may additionally be parameterized based on lateral distance from a route reference. In such an example, the lateral distance may be associated with a distance of an end point of the arc length based trajectory from a route reference.

In some examples, the planning component may generate hundreds, thousands, or millions of candidate trajectories using the state space and may select a single trajectory from among the candidate trajectories to control the vehicle over a time period, as discussed in more detail in U.S. patent application Ser. No. 17/394,334, filed Aug. 4, 2021. In some examples, multiple trajectories may be stitched together to form a path up to a time horizon. For example, a first trajectory may be selected from among a first set of candidate trajectories to control the vehicle 102 for t=0 to t=2 seconds, a second trajectory may be selected from among a second set of candidate trajectories to control the vehicle 102 for t=2 seconds to t=4 seconds, and so on until a time horizon is met (e.g., 5 seconds, 8 seconds, 10 seconds). Although an interval of two seconds is used in the example above, any other interval may be used (e.g., 10 milliseconds, 100 milliseconds, 500 milliseconds, 1 second, 2 seconds, 5 seconds). In such an example, the second set of candidate trajectories may be generated based at least in part on the first set of candidate trajectories and/or the first trajectory such that a continuous path may be generated. In other words, the second trajectory may start where the first trajectory ends and may be associated with a velocity, heading, steering rate, acceleration, etc. that is continuous with the first trajectory. Additionally or alternatively, "stitching" a path together may include a path smoothing operation that ensures that the transition between each trajectory and the entire path is smooth—there are no changes in velocity, acceleration, position, steering rate, etc. that are discontinuous or that meet or exceed a threshold change. The path smoothing operation may comprise small modifications to one of more of the trajectories to further smooth the overall path.

FIG. 1 depicts an example of a trajectory 136 that may ultimately be selected from among candidate trajectories according to the techniques discussed herein, represented as an arrow indicating a target steering angle, target steering rate, target velocity, and/or target acceleration for the controller(s) 116 to track, although the trajectory itself may comprise instructions for controller(s), which may, in turn, actuate a drive system of the vehicle 102.

In some examples, the planning component 112 may further comprise an open loop control 114. If a trajectory selected by the planning component 112 is associated with a velocity that is less than a threshold velocity, the planning component 112 may provide the trajectory to the open loop controller 114 as input or may transition control to the open loop controller 114 until the threshold velocity is reached (in instances where the vehicle is speeding up from a stand still) or 0 where the vehicle is slowing down to a stop. In some examples, the threshold velocity may be 0.5 miles per hour, 1 mile per hour, 1.1 miles per hour, 2 miles per hour, or any other "slow" speed.

Example System

Figure 2:
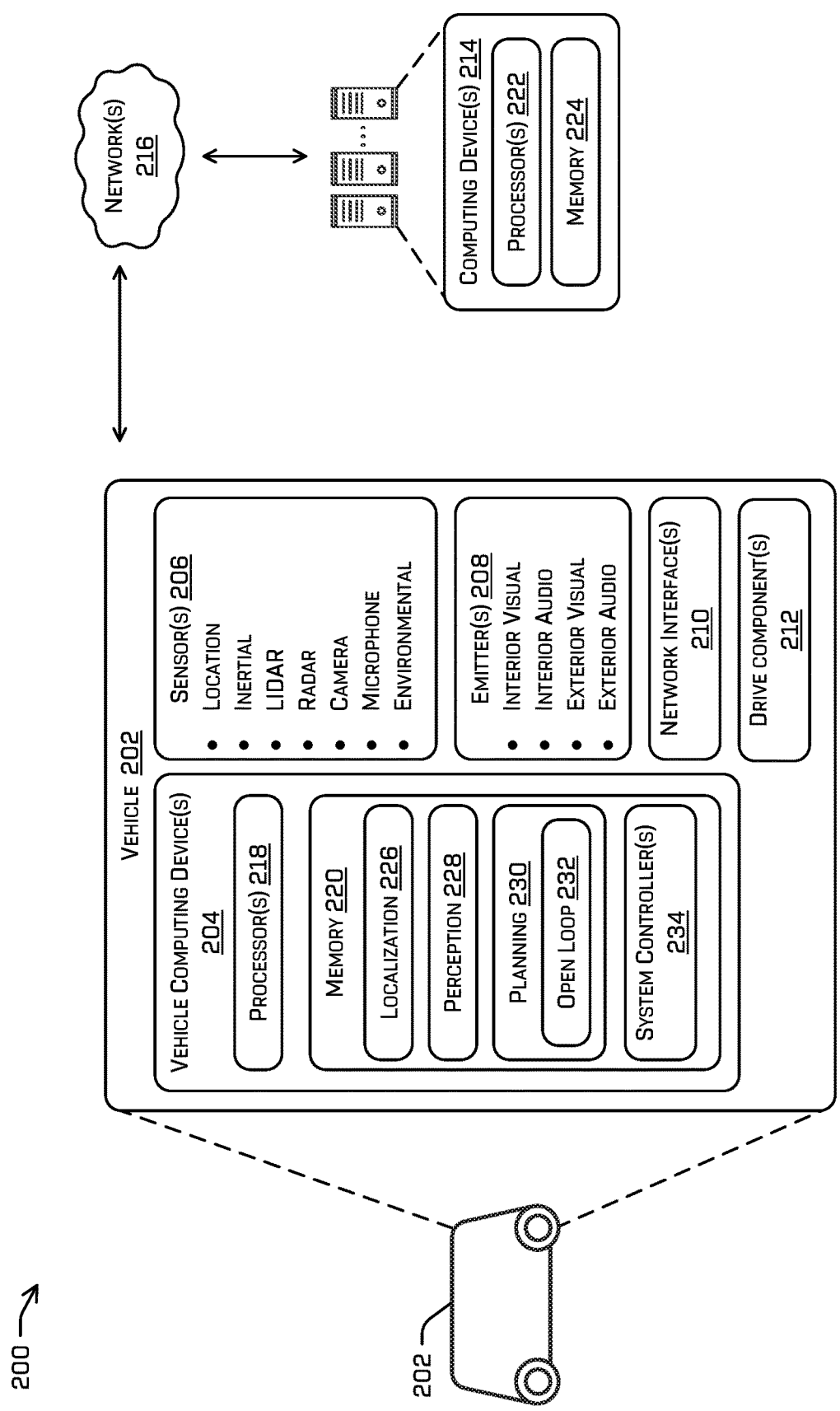
FIG. 2 illustrates a block diagram of an example autonomous vehicle architecture.

FIG. 2 illustrates a block diagram of an example system 200 that implements the techniques discussed herein. In some instances, the example system 200 may include a vehicle 202, which may represent the vehicle 102 in FIG. 1. In some instances, the vehicle 202 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 202 may be a fully or partially autonomous vehicle having any other level or classification. Moreover, in some instances, the techniques described herein may be usable by non-autonomous vehicles as well.

The vehicle 202 may include a vehicle computing device(s) 204, sensor(s) 206, emitter(s) 208, network interface(s) 210, and/or drive component(s) 212. Vehicle computing device(s) 204 may represent computing device(s) 106 and sensor(s) 206 may represent sensor(s) 104. The system 200 may additionally or alternatively comprise computing device(s) 214.

In some instances, the sensor(s) 206 may represent sensor(s) 104 and may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 206 may include multiple instances of each of these or other types of sensors. For instance, the radar sensors may include individual radar sensors located at the corners, front, back, sides, and/or top of the vehicle 202. As another example, the cameras may include multiple cameras disposed at various locations about the exterior and/or interior of the vehicle 202. The sensor(s) 206 may provide input to the vehicle computing device(s) 204 and/or to computing device(s) 214. The position associated with a simulated sensor, as discussed herein, may correspond with a position and/or point of origination of a field of view of a sensor (e.g., a focal point) relative the vehicle 202 and/or a direction of motion of the vehicle 202.

The vehicle 202 may also include emitter(s) 208 for emitting light and/or sound, as described above. The emitter(s) 208 in this example may include interior audio and visual emitter(s) to communicate with passengers of the vehicle 202. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 208 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 202 may also include network interface(s) 210 that enable communication between the vehicle 202 and one or more other local or remote computing device(s). For instance, the network interface(s) 210 may facilitate communication with other local computing device(s) on the vehicle 202 and/or the drive component(s) 212. Also, the network interface(s) 210 may additionally or alternatively allow the vehicle to communicate with other nearby computing device(s) (e.g., other nearby vehicles, traffic signals, etc.). The network interface(s) 210 may additionally or alternatively enable the vehicle 202 to communicate with computing device(s) 214. In some examples, computing device(s) 214 may comprise one or more nodes of a distributed computing system (e.g., a cloud computing architecture).

The network interface(s) 210 may include physical and/or logical interfaces for connecting the vehicle computing device(s) 204 to another computing device or a network, such as network(s) 216. For example, the network interface(s) 210 may enable Wi-Fi-based communication such as via frequencies defined by the IEEE 200.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s). In some instances, the vehicle computing device(s) 204 and/or the sensor(s) 206 may send sensor data, via the network(s) 216, to the computing device(s) 214 at a particular frequency, after a lapse of a predetermined period of time, in near real-time, etc.

In some instances, the vehicle 202 may include one or more drive components 212. In some instances, the vehicle 202 may have a single drive component 212. In some instances, the drive component(s) 212 may include one or more sensors to detect conditions of the drive component(s) 212 and/or the surroundings of the vehicle 202. By way of example and not limitation, the sensor(s) of the drive component(s) 212 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 212. In some cases, the sensor(s) on the drive component(s) 212 may overlap or supplement corresponding systems of the vehicle 202 (e.g., sensor(s) 206).

The drive component(s) 212 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 212 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive component(s) 212. Furthermore, the drive component(s) 212 may also include one or more communication connection(s) that enable communication by the respective drive component with one or more other local or remote computing device(s).

The vehicle computing device(s) 204 may include processor(s) 218 and memory 220 communicatively coupled with the one or more processors 218. Memory 220 may represent memory 108. Computing device(s) 214 may also include processor(s) 222, and/or memory 224. The processor(s) 218 and/or 222 may be any suitable processor capable of executing instructions to process data and perform operations as described herein. By way of example and not limitation, the processor(s) 218 and/or 222 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 220 and/or 224 may be examples of non-transitory computer-readable media. The memory 220 and/or 224 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 220 and/or memory 224 may store a localization component 226, perception component 228, planning component 230, open loop component 232, and/or system controller(s) 234—zero or more portions of any of which may be hardware, such as GPU(s), CPU(s), and/or other processing units. Perception component 228 may represent perception component 110, planning component 230 may represent planning component 112, and open loop component 232 may represent open loop controller 114.

In at least one example, the localization component 226 may include hardware and/or software to receive data from the sensor(s) 206 to determine a position, velocity, and/or orientation of the vehicle 202 (e.g., one or more of an x-, y-, z-position, roll, pitch, or yaw). For example, the localization component 226 may include and/or request/receive map(s) of an environment and can continuously determine a location, velocity, and/or orientation of the autonomous vehicle within the map(s). In some instances, the localization component 226 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 226 may provide data to various components of the vehicle 202 to determine an initial position of an autonomous vehicle for generating a trajectory and/or for generating map data, as discussed herein. In some examples, localization component 226 may provide, to the perception component 228, a location and/or orientation of the vehicle 202 relative to the environment and/or sensor data associated therewith.

In some instances, perception component 228 may comprise a primary perception system and/or a prediction system implemented in hardware and/or software. The perception component 228 may detect object(s) in in an environment surrounding the vehicle 202 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. The perception component 228 may include a prediction component that predicts actions/states of dynamic components of the environment, such as moving objects. In some examples, the perception component 228 may include a simulation component as part of the prediction portion of the perception component 228, although the prediction portion may include a kinematics-based component and/or a Kalman filter for determining a predicted position, heading, velocity, acceleration, and/or the like associated with a dynamic object. Data determined by the perception component 228 is referred to as perception data.

The planning component 230 may receive a location and/or orientation of the vehicle 202 from the localization component 226 and/or perception data from the perception component 228 and may determine instructions for controlling operation of the vehicle 202 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic, such as may be generated by system controller(s) of the drive component(s) 212)) that the drive component(s) 212 may parse/cause to be carried out, second instructions for the emitter(s) 208 may be formatted according to a second format associated therewith). In some examples, where the planning component 230 may comprise hardware/software-in-a-loop in a simulation (e.g., for testing and/or training the planning component 230), the planning component 230 may generate instructions which may be used to control a simulated vehicle. These instructions may additionally or alternatively be used to control motion of a real-world version of the vehicle 202, e.g., in instances where the vehicle 202 runs the simulation runs on vehicle during operation.

In some examples, in order to generate a path, which may comprise multiple contiguous trajectories (e.g., one trajectory begins where another one ends, including a continuous heading, velocity, acceleration, etc.), the planning component 230 may execute a tree search and may determine action node(s) and/or prediction node(s) of the tree search by transmitting a request for the planning component to generate candidate action(s) based at least in part on an environment determined in association with a prediction node. The planning component 230 may receive an initial state of the environment from the perception component 228 (i.e., in association with a root node of the tree search), which the planning component 230 may use to determine one or more candidate actions for a first time period (e.g., 0 to 1 second, 0 to 2 seconds, 0 to 0.5 seconds in the future). For example, the tree search may include executing a Monte-Carlo tree search (MCTS); partially observable Monte-Carlo planning (POMCP); Markov decision process (MDP), such as a partially observable MDP (POMDP); or the like. Additional details regarding the tree search and how to identify the trajectory and/or path to use to control the vehicle 202 are discussed in U.S. patent application Ser. No. 17/394,334, filed Aug. 4, 2021, the entirety of which is incorporated herein.

In some examples, the planning component 230 may comprise an open loop component 232 that may control motion of the vehicle at slow speeds, i.e., speeds below a speed threshold. The open loop component 232 may comprise hardware and/or software. For example, the open loop component 232 may include an ASIC, FPGA, microcontroller, or the like or may use a microprocessor or GPU to determine a trajectory for controlling the vehicle at slow speeds. The particular manner in which the open loop component 232 does this is discussed in further detail below.

The memory 220 and/or 224 may additionally or alternatively store a mapping system, a planning system, a ride management system, etc. Although perception component 228, planning component 230, and/or open loop component 232 are illustrated as being stored in memory 220 and/or 224, perception component 228, planning component 230, and/or open loop component 232 may include processor-executable instructions, machine-learned model(s) (e.g., a neural network), and/or hardware, such as an ASIC, FPGA, microcontroller, or the like.

As described herein, the localization component 226, the perception component 228, the planning component 230, and/or other components of the system 200 may comprise one or more ML models. For example, localization component 226, the perception component 228, and/or the planning component 230 may each comprise different ML model pipelines. In some examples, an ML model may comprise a neural network. An exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like. In some examples, the ML model discussed herein may comprise PointPillars, SECOND, top-down feature layers (e.g., see U.S. patent application Ser. No. 15/963,833, the entirety of which is incorporated by reference herein), and/or VoxelNet. Architecture latency optimizations may include MobilenetV2, Shufflenet, Channelnet, Peleenet, and/or the like. The ML model may comprise a residual block such as Pixor, in some examples.

Memory 220 may additionally or alternatively store one or more system controller(s) 234 (which may be a portion of the drive component(s)), which may be configured to control steering, propulsion, braking, safety, emitters, communication, and other systems of the vehicle 202. These system controller(s) 234 may communicate with and/or control corresponding systems of the drive component(s) 212 and/or other components of the vehicle 202. For example, the planning component 230 may generate instructions based at least in part on perception data generated by the perception component 228, such as according the techniques discussed herein, and transmit the instructions to the system controller(s) 234, which may control operation of the vehicle 202 based at least in part on the instructions.

It should be noted that while FIG. 2 is illustrated as a distributed system, in alternative examples, components of the vehicle 202 may be associated with the computing device(s) 214 and/or components of the computing device(s) 214 may be associated with the vehicle 202. That is, the vehicle 202 may perform one or more of the functions associated with the computing device(s) 214, and vice versa.

Example State Space

Figure 3:
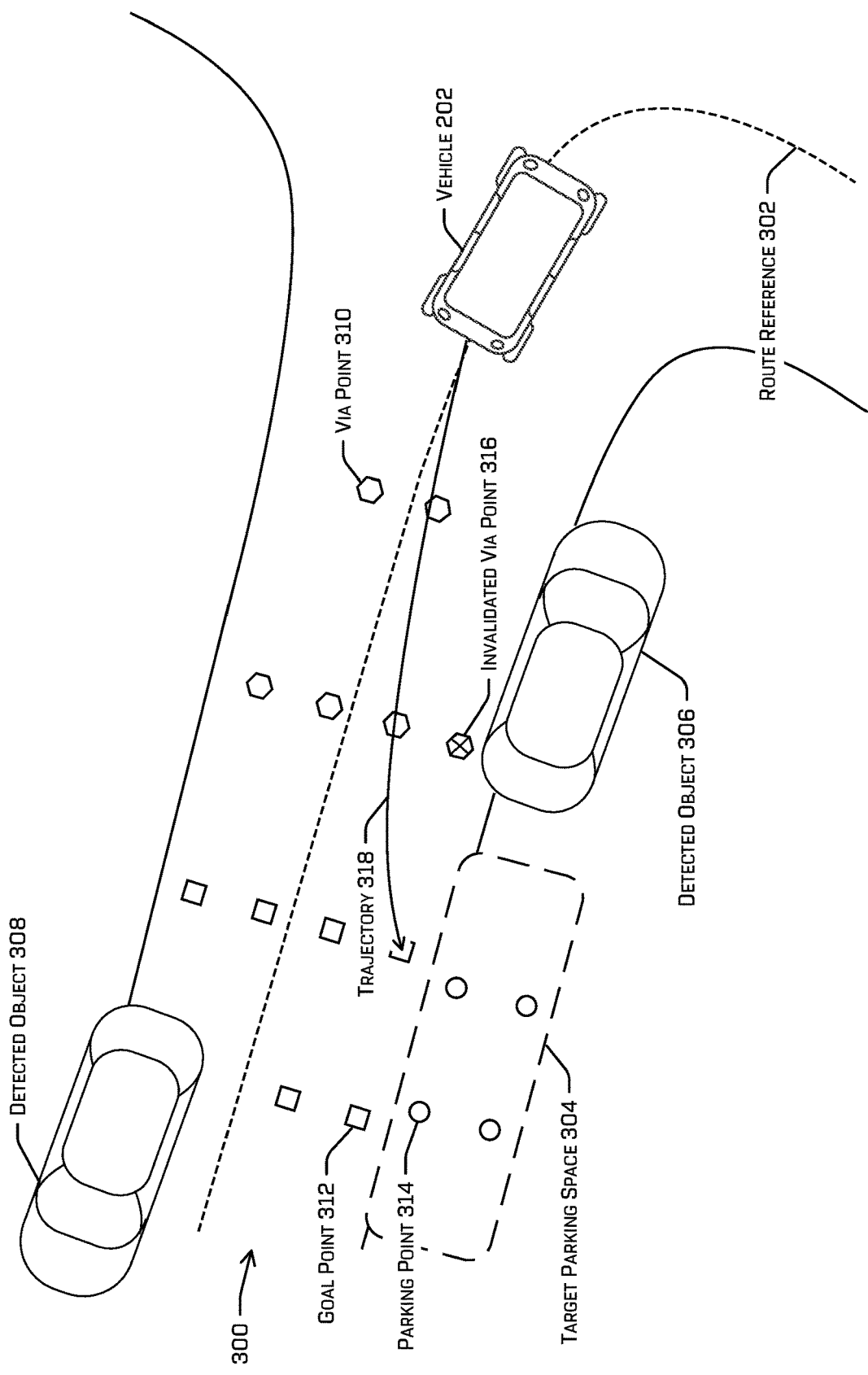
FIG. 3 illustrates an example sampled state space, including goal points and via points. This example state space is parameterized according to lateral distance from and/or displacement along a route reference.

FIG. 3 depicts an example sampled state space 300, including states that are sampled as goal points and other states that are sampled as via points. For simplicity, this example state space is parameterized according to lateral distance from and/or displacement along a route reference since the points discussed herein are associated with a position in the environment and are therefore easier to depict and consequently understand. The techniques described herein may be used for an arc length and/or arc length derivative parameterized state space instead of lateral distance from and displacement along a route reference. Instead of determining a trajectory (controls) sufficient to arrive at a lateral distance from and displacement along a reference route, the planning component may determine a trajectory sufficient to accomplish an arc length and/or arc length derivative(s) specified by a state of the state space.

FIG. 3 depicts a route reference 302 that includes turning onto a road from another road. The depicted example also includes a target parking space 304 that may be determined based at least in part on perception data, route data, map data. For example, the route data may specify that a passenger in the vehicle 202 desires to be let off on a block associated with the target parking space 304 and the vehicle 202 may use map data to identify the existence of parking spaces and perception data to determine that the target parking space 304 is empty. The planning component of the vehicle 202 may receive perception data indicating the existence of an object in the environment, such as detected object 306 and detected object 308, and the existence of the empty parking space (target parking space 304). The planning component may determine the state space constrained based at least in part on the perception data, such as by limiting the state space based at least in part on a maximum legal velocity, which may be adjusted downward for weather conditions, traffic, the presence of pedestrian(s), cyclist(s), children, construction zones, and the like; a buffer distance from detected object(s) and lane or roadway edges, etc.

Once general limits to the state space have been determined, the planning component may sample the state space, which may comprise determining via points, illustrated as hexagons such as via point 310, and/or goal points, illustrated as squares such as goal point 312. Note that the limitations of the state space may constrain the state space such that the samples are not always generated in a uniform pattern and samples may be removed (or never sampled in the first place) based at least in part on the limits. For example, via point 316 may be invalidated based at least in part on the limits, e.g., due to a buffer around the detected object 306, or may have never been sampled because the via point 316 would be in a portion of perception data indicated as being unavailable.

The planning component may sample the state space based at least in part on a sampling rate that may be based at least in part on the parameterization type of the state space. In the illustrated example, the state space may indicate lateral distance from the route reference 302, displacement along the route reference 302, speed, and/or heading. Note that speed and heading are not depicted and that the state space may be a four or more-dimensional space in some instances, although other dimensionalities are contemplated. Via points may indicate intermediate states that a vehicle may achieve before reaching a goal point that indicates a final state. In some examples, goal points may be used during nominal driving and via points may be received from a teleoperations device or may be determined in association with an intermediate time in the control time period. For example, if the control time period is 0.5 seconds, via points may be generated in association with 0.25 seconds and/or 0.12 seconds, or the like.

Other types of points, such as conditional points, illustrated as a circle such as parking point 314, may be available to the vehicle under conditional circumstances and in association with particular parts of the roadway, such as when the vehicle route includes parking on the street, when the vehicle detects that enough passengers are present in the vehicle 202 to qualify for travelling in a commuter lane, or the like. Ultimately, the points may be samples of the state space at an interval or randomly.

Generating a trajectory, such as trajectory 318 may include determining controls sufficient to cause the vehicle to achieve state(s) indicated by via point(s) and/or a goal point. The controls may specify steering, acceleration(s), and/or velocity(ies) associated with a minimum jerk that will bring the vehicle 202 to a state indicated by a goal point at a time associated with the goal point. The trajectory 318 also includes controls that specify steering, acceleration, and/or velocity instructions sufficient to bring the vehicle 202 to states identified by two intervening via points at the respective times associated therewith.

Figure 4:
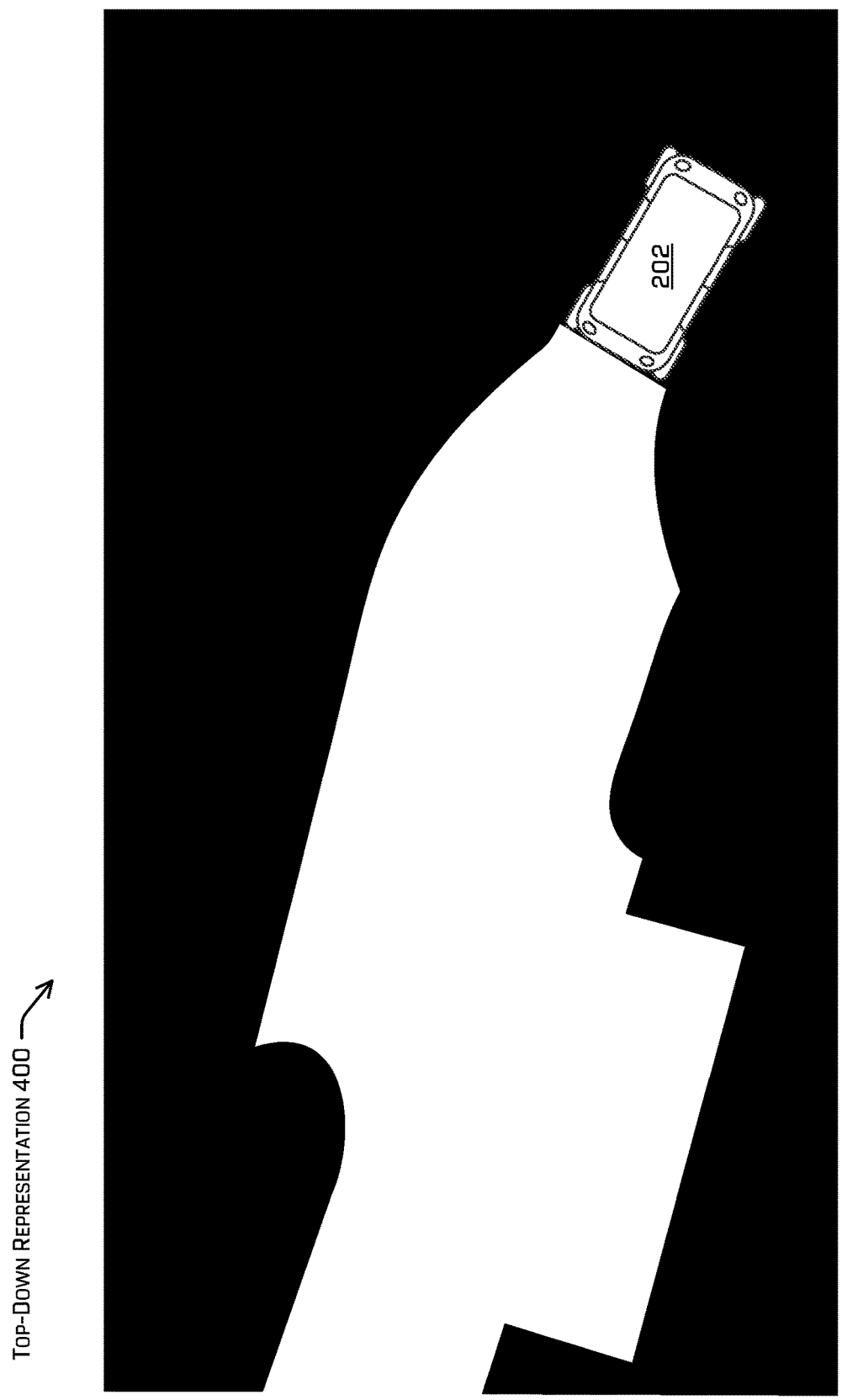
FIG. 4 illustrates an example of a top-down representation of unavailable space determined by a perception component of the vehicle that may be used by the planning component to constrain the state space determined by the planning component and/or how the state space is sampled.

FIG. 4 illustrates an example of a top-down representation 400 of unavailable space determined by a perception component of the vehicle that may be used to constrain the state space determined by the planning component and/or alter how the state space is sampled. The shaded portion may be a portion of the environment that the planning component determines to be unavailable based at least in part on the perception data and a rule set. For example, the planning component may indicate any portion of the environment that is currently occupied by a static and/or dynamic object as being occupied and therefore unavailable. The planning component may additionally or alternatively determine state space(s) associated with future time(s) and may indicate that predicted positions of dynamic object(s) are unavailable. In at least one example, the planning component may base the unavailability of a position in the state space based at least in part on a confidence associated with an indication that a position is or may be occupied. Such confidences are discussed in more detail in U.S. patent application Ser. No. 16/872,284, filed May 11, 2020, the entirety of which is incorporated herein by reference.

The rule set may indicate rules such as a buffer that specifies a distance from any detected object to additionally indicate as being unavailable, rules of the road (e.g., indicated oncoming lanes as being unavailable), etc. The white space is the portion of the state space that may be sampled, at least in an example where the state space is parameterized according to position. For arc length parameterization, such a limitation may still be used for sampling but an estimated of position may be determined before selecting a sample from which to generate a trajectory or afterwards, to determine whether to keep a generated trajectory.

Example Process

Figure 5A:
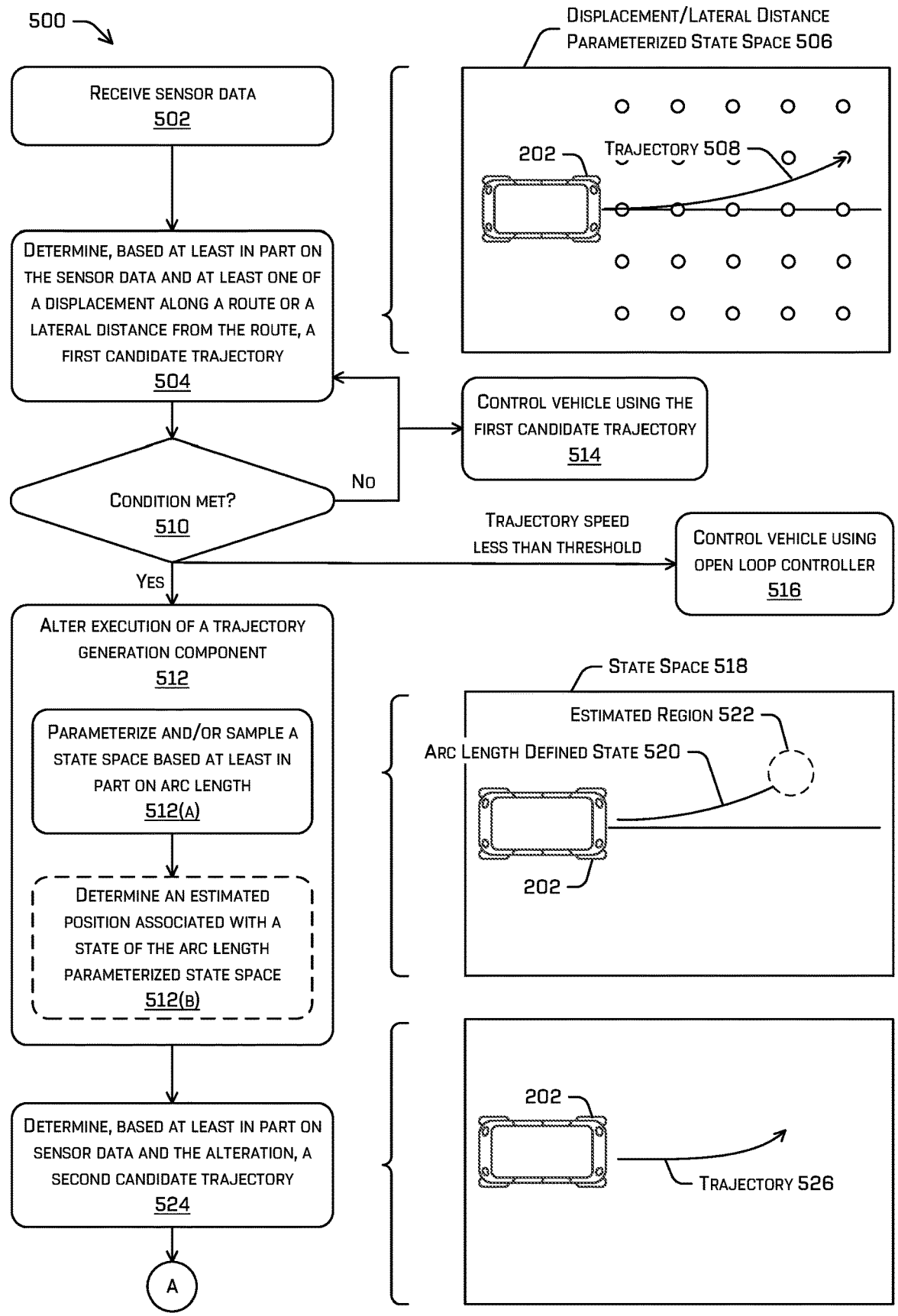
FIGS. 5A and 5B illustrate an example process for altering a trajectory generation component to generate trajectories based at least in part on an arc length and/or arc length derivative(s).
Figure 5B:
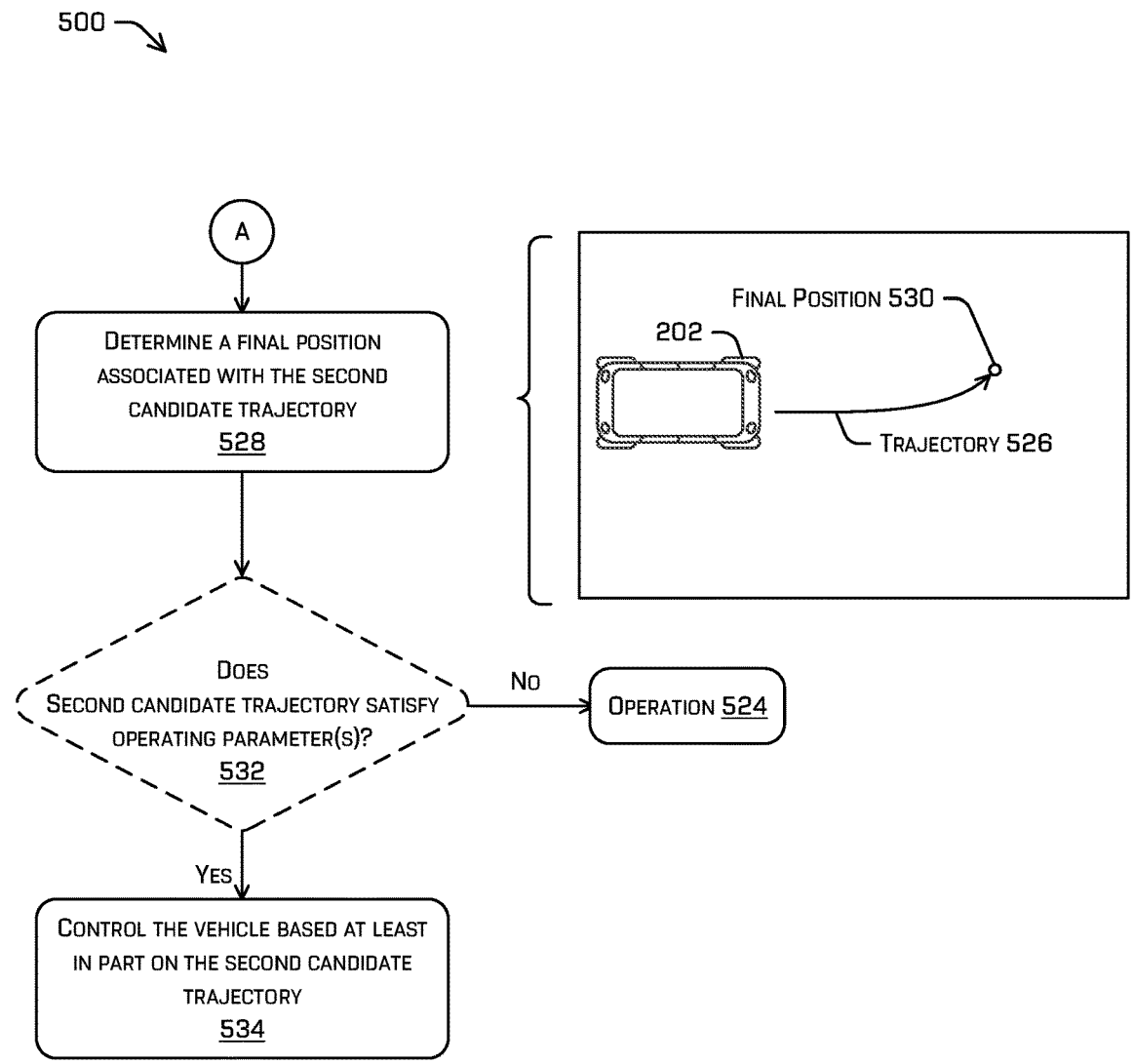

FIGS. 5A and 5B illustrate a pictorial flow diagram of an example process 500 for altering how trajectories for controlling a vehicle are generated. The example process 500 may be part of a technique for determining a path (multiple contiguous trajectories) for controlling the vehicle and may be executed by a planning component of the vehicle in cooperation with a perception component of the vehicle. The vehicle may be vehicle 202, for example.

At operation 502, example process 500 may comprise receiving sensor data from one or more sensors, according to any of the techniques discussed herein. The sensor(s) may be associated with the vehicle and/or another computing device. Operation 502 may additionally or alternatively comprise determining perception data, as discussed above, based at least in part on the sensor data. In some examples, the perception component may determine the perception data, which may include determining a curvature of a roadway, detecting the presence of passenger(s) in the vehicle, detecting weather and/or traffic conditions, a jerk and/or acceleration experienced by the vehicle, etc. The perception data may be associated with a most recently received set of sensor data (e.g., a current time, although there may be a small delay between receiving the sensor data and determining the perception data).

At operation 504, example process 500 may comprise determining, based at least in part on the sensor data and at least one of a displacement along a route or a lateral distance from the route, a first candidate trajectory. Operation 504 may include determining a state space based at least in part on the sensor data and/or perception data, which may be used to bound the state space. For example, operation 504 may include determining a displacement and/or lateral distance parameterized state space 506, as depicted in FIG. 5, which may be similar to the state space discussed in FIGS. 3 and 4. Determining the first trajectory, depicted as trajectory 508, for such a state space may include selecting a sampled state (e.g., according to a tree search) and determining controls sufficient to bring the vehicle to the state at the future time associated with the state. For example, a state may be selected based at least in part on a using a tree search algorithm like a Monte Carlo tree search (MCTS), partially observable Markov decision process (POMDP), or the like, as discussed in more detail in U.S. patent application Ser. No. 17/394,334, filed Aug. 4, 2021.

For example, the trajectory may specify steering and acceleration instructions for the controller such that, at any time t, the controller tracks (controls the vehicle to be as close as possible to) a displacement, s, along the route and a normal distance to the predefined route, $e_y$, (i.e., a lateral distance), such that:

$$s(t) = a_1 + a_2 t + a_3 t^2 + a_4 t^3 + a_5 t^4 + a_6 t^5 \quad (1)$$

$$e(t) = b_1 + b_2 t + b_3 t^2 + b_4 t^3 + b_5 t^4 + b_6 t^5 \quad (2)$$

where the coefficients are given by:

$$\begin{bmatrix} s_0 \\ \dot{s}_0 \\ \frac{\ddot{s}_0}{2} \\ -\frac{10s_0}{t_f^3} + \frac{10s_f}{t_f^3} - \frac{6\dot{s}_0}{t_f^2} - \frac{4\dot{s}_f}{t_f^2} - \frac{3\ddot{s}_0}{2t_f} + \frac{\ddot{s}_f}{2t_f} \\ \frac{15s_0}{t_f^4} - \frac{15s_f}{t_f^4} + \frac{8\dot{s}_0}{t_f^3} + \frac{7\dot{s}_f}{t_f^3} + \frac{3\ddot{s}_0}{2t_f^2} - \frac{\ddot{s}_f}{t_f^2} \\ -\frac{6s_0}{t_f^5} + \frac{6s_f}{t_f^5} - \frac{3\dot{s}_0}{t_f^4} - \frac{3\dot{s}_f}{t_f^4} - \frac{\ddot{s}_0}{2t_f^3} + \frac{\ddot{s}_f}{2t_f^3} \\ e_{y0} \\ \dot{e}_{y0} \\ \frac{\ddot{e}_{y0}}{2} \\ -\frac{10s_0}{t_f^3} + \frac{10s_f}{t_f^3} - \frac{6\dot{s}_0}{t_f^2} - \frac{4\dot{s}_f}{t_f^2} - \frac{3\ddot{s}_0}{2t_f} + \frac{\ddot{s}_f}{2t_f} \\ \frac{15s_0}{t_f^4} - \frac{15s_f}{t_f^4} + \frac{8\dot{s}_0}{t_f^3} + \frac{7\dot{s}_f}{t_f^3} + \frac{3\ddot{s}_0}{2t_f^2} - \frac{\ddot{s}_f}{t_f^2} \\ -\frac{6s_0}{t_f^5} + \frac{6s_f}{t_f^5} - \frac{3\dot{s}_0}{t_f^4} - \frac{3\dot{s}_f}{t_f^4} - \frac{\ddot{s}_0}{2t_f^3} + \frac{\ddot{s}_f}{2t_f^3} \end{bmatrix} = \begin{bmatrix} a_1 \\ a_2 \\ a_3 \\ a_4 \\ a_5 \\ a_6 \\ b_1 \\ b_2 \\ b_3 \\ b_4 \\ b_5 \\ b_6 \end{bmatrix} \quad (3)$$

where $s_0$ is the initial displacement along the route, $s_f$ is the final displacement, $t_f$ is the final time, $e_{y0}$ is an initial normal distance to the route, $e_{yf}$ is a final normal distance, a single dot represents the first derivative (e.g., $\dot{s}_0$), and two dots represents the second derivative (e.g., $\ddot{s}_0$).

For a displacement and lateral distance parameterized state space determining such controls may include determining controls sufficient to bring the vehicle to a lateral distance from and displacement along the route specified by the selected state. In at least one example, operation 504 may additionally or alternatively include generating a group of candidate trajectories based at least in part on the sensor data and at least one of a displacement along a route or a lateral distance from the route. The planning component may select one of the trajectories of the group of candidate trajectories as the trajectory to be implemented, which may be the first candidate trajectory discussed herein.

At operation 510, example process 500 may comprise determining whether a condition has been met. Operation 510 may be based at least in part on the first trajectory, sensor data, and/or perception data. Determining whether the condition has been met may be a switching criteria to switch from first trajectory generation software and/or hardware (i.e., according to operation 504) to second trajectory generation software and/or hardware (i.e., according to operations 512-534). In another example, the two trajectory generation types may execute contemporaneously. In other words, candidate trajectories may be generated according to operation 504 and operation(s) 512 and/or 524 at the same time. In such an example, a cost may be determined in association with each trajectory (see, U.S. patent application Ser. No. 17/125,890, filed Dec. 17, 2020, the entirety of which is incorporated herein by reference, for a discussion of how to generate such costs) Determining whether the condition has been met may depend on condition(s) with which the vehicle has been configured. Determining whether the condition has been met may comprise one or more of the following determinations.

The perception component may determine, based at least in part on the sensor data, whether at least one passenger is present in the vehicle. If a passenger is present, example process 500 may include continuing to operation 512. Otherwise, example process 500 may include continuing to operation 514, which may comprise controlling the vehicle using the first candidate trajectory.

The perception component and/or a localization component may determine, based at least in part on the sensor data and/or map data, whether a curvature of a roadway and/or the first candidate trajectory meets or exceeds a threshold curvature. If the curvature meets or exceeds the threshold curvature, the example process 500 may include continuing to operation 512. If a speed associated with the first trajectory is less than a threshold or if the vehicle is currently stopped, example process 500 may include transitioning to operation 516, which includes using the open loop controller to control the vehicle instead of a closed loop controller, which may be the nominal controller for the vehicle. If the curvature is less than the threshold curvature, the example process 500 may include transitioning to operation 514, which may comprise controlling the vehicle using the first candidate trajectory.

The perception component may determine, based at least in part on the sensor data, whether traffic complexity or density meets or exceeds a threshold, whether weather conditions indicate that the roadway surface is slippery or wet, or the like. If a traffic complexity score or density meets or exceeds a threshold and/or if the perception data (or weather data received from a remote device or a sensor) indicates that weather conditions include slippery, wet, or other adverse weather, the example process 500 may include transitioning to operation 512.

Any combination of the conditions, such as whether the curvature exceeds a threshold curvature and whether a passenger is detected as being present.

At operation 514, example process 500 may comprise controlling the vehicle using the first candidate trajectory. In some examples, this may be the result of determining to select the first candidate trajectory from among other candidate trajectories, such as a tree search technique.

At operation 516, example process 500 may comprise controlling the vehicle using an open loop controller. The open loop controller may control the vehicle for speeds between 0 and a threshold velocity, such as 0.5 miles per hour, 0.8 miles per hour, 1 mile per hour, 1.1 miles per hour, 2 miles per hour, or any other rather slow speed. The open loop controller is unable to guarantee a final stop time, when approaching zero, or a time at which the vehicle will reach the velocity threshold, when speeding up. The open loop controller may maintain a steering heading and/or steering rate during the open loop controller's control of the vehicle. The open loop controller with therefore determine a trajectory for controlling the vehicle based at least in part on a last-used steering heading (for slowing down) or a heading associated with a direction of the roadway relative to the vehicle (for speeding up). The open loop controller may determine, using an analytical equation that assumes constant jerk and constant acceleration for a range that is inside zero and the threshold velocity (e.g., if the threshold velocity is 1 second, the range may be 0.1 seconds to 0.9 seconds, 0.2 seconds to 0.8 seconds) to generate a trajectory that slows to zero or speeds up to the threshold velocity (at which time the closed loop controller would take over at operation 504).

At operation 512, example process 500 may comprise altering execution of a trajectory generation component of the vehicle. This may comprise changing hardware used and/or software called for trajectory generation and may ultimately result in parameterizing the state space differently and parameterizing the trajectories differently. This may cause the candidate trajectories generated according to this alteration to vary from the candidate trajectories generated according to operation 504. Namely, the candidate trajectories generated using an arc length parameterized space may have less jerk and/or less lateral acceleration than candidate trajectories generated using other state spaces, such as at operation 504. The arc length parameterized trajectories may maintain more constant accelerations overall, whether longitudinal and/or lateral.

Operation 512 may comprise, at operation 512(a) (re-) parameterizing and/or sampling a state space based at least in part on arc length and/or derivatives thereof. The state space may additionally be parameterized based on lateral distance ($e_y$) and derivatives thereofn, in some examples. FIG. 5A depicts such an example state space 518. An arc length defined state 520 may lack a definition of position, as illustrated by the equations below. A future state, x, of the vehicle in the state space, may be given by the following equation in a route-frame model:

$$x=(e_y, e_\theta, l, v_x, S, \kappa) \quad (4)$$

where $e_y$ is the lateral distance (normal distance) from the route, $e_\theta$ is the heading error from the reference path, l is the vehicle arclength, $v_x$ is the longitudinal vehicle velocity at a point of zero lateral velocity, s is a displacement along the reference path, and $\kappa$ is the state curvature. In some examples, the state curvature may exist in the state space and may be used as part of the trajectory (in the control space). The arc length parameterized state curvature, $\kappa$, may be given as:

$$\kappa = \frac{\dot{e}_\theta + \kappa_r \dot{s}}{v_x} \quad (5)$$

where $\kappa_r$ is a curvature of the reference route. This is a parameterization based on arc length, arc length's derivatives, and/or lateral distance, $e_y$, the variables of equation can each be derived from on arc length, arc length's derivatives, and/or lateral distance. For example, the derivative of displacement in equation (5) may be derived as follows:

$$\dot{s} = \frac{v_x \cos e_\theta}{1 - k_r e_y} \quad (6)$$

The velocity and/or acceleration indicated in the state space (or as needed to derive the curvature, $\kappa$, may parameterized according to arc length according to:

$$\ddot{l}=\dot{v}_x=a_x \quad (7)$$

The arc length parameterized heading error may be given by:

$$e_\theta = \arcsin\left(\frac{\dot{e}_y}{\dot{\ell}}\right) \quad (8)$$

In some examples, operation 512 may further comprise, at operation 512(b), determining an estimated position and/or estimated region (e.g., estimated region 522) associated with a state of the arc length parameterized state space. In some examples, determining the estimated position and/or region may comprise using a heuristic to determine the position and/or region based at least in part on treating the arc length trajectory as a straight line and solving the Pythagorean theorem for displacement, where the arc length is treated as the distance of the hypotenuse, the lateral distance ($e_y$) may be treated as the length of a leg of the triangle, and the displacement along the route may be treated as the length of the other leg and may be the term solved for. This estimated position and/or region may be used by a tree search or another algorithm that selects a state from which to generate a trajectory, e.g., as part of an exploration operation that may be part of a tree search iteratively exploring (determining) a trajectory, evaluating whether that trajectory is suitable and/or determining a cost associated with the trajectory, adding the trajectory to a path if the trajectory is suitable and/or has a lowest cost, and so on until the path is complete (e.g., the horizon time each reached), as discussed in more detail in U.S. patent application Ser. No. 17/394,334, filed Aug. 4, 2021. In particular, the estimated point and/or region may be used to determine whether a trajectory determined based on a particular state is likely to result in an impact with an object, thereby potentially preventing the trajectory from being explored (i.e., the particular state being selected and a trajectory being determined based thereon). Additionally or alternatively, the estimated point and/or region may be used as part of a cost determination associated with the trajectory, as discussed in more detail in U.S. patent application Ser. No. 17/394,334, filed Aug. 4, 2021.

At operation 524, example process 500 may comprise determining, based at least in part on the sensor data and the alteration (e.g., according to the state space determined at 512(b)), a second candidate trajectory. Determining the second candidate trajectory may comprise determining controls suitable to bring the vehicle to a state defined by equations (5)-(8), i.e., a particular arc length, velocity, and/or lateral distance. The trajectory 526 may be such a second candidate trajectory. Note that, upon determining the trajectory, a final position may be determined based at least in part on integrating the curvature equation. In some examples, the arc length and lateral offset at a particular time be given according to the following equation:

$$l(t)=c_1+c_2 t+c_3 t^2+c_4 t^3+c_5 t^4+c_6 t^5 \quad (9)$$

$$e_y(t)=d_1+d_2 t+d_3 t^2+d_4 t^3+d_5 t^4+d_6 t^5 \quad (10)$$

where the coefficients are given by:

$$\begin{bmatrix} l_0 \\ \dot{l}_0 \\ \dfrac{\ddot{l}_0}{2} \\ -\dfrac{10 l_0}{t_f^3} + \dfrac{10 l_f}{t_f^3} - \dfrac{6 \dot{l}_0}{t_f^2} - \dfrac{4 \dot{l}_f}{t_f^2} - \dfrac{3 \ddot{l}_0}{2 t_f} + \dfrac{\ddot{l}_f}{2 t_f} \\ \dfrac{15 l_0}{t_f^4} - \dfrac{15 l_f}{t_f^4} + \dfrac{8 \dot{l}_0}{t_f^3} + \dfrac{7 \dot{l}_f}{t_f^3} + \dfrac{3 \ddot{l}_0}{2 t_f^2} - \dfrac{\ddot{l}_f}{t_f^2} \\ -\dfrac{6 l_0}{t_f^5} + \dfrac{6 l_f}{t_f^5} - \dfrac{3 \dot{l}_0}{t_f^4} - \dfrac{3 \dot{l}_f}{t_f^4} - \dfrac{\ddot{l}_0}{2 t_f^3} - \dfrac{\ddot{l}_f}{2 t_f^3} \\ e_{y0} \\ \dot{e}_{y0} \\ \dfrac{\ddot{e}_{y0}}{2} \\ -\dfrac{10 e_{y0}}{t_f^3} + \dfrac{10 e_{yf}}{t_f^3} - \dfrac{6 \dot{e}_{y0}}{t_f^2} - \dfrac{4 \dot{e}_{yf}}{t_f^2} - \dfrac{3 \ddot{e}_{y0}}{2 t_f} + \dfrac{\ddot{e}_{yf}}{2 t_f} \\ \dfrac{15 e_{y0}}{t_f^4} - \dfrac{15 e_{yf}}{t_f^4} + \dfrac{8 \dot{e}_{y0}}{t_f^3} + \dfrac{7 \dot{e}_{yf}}{t_f^3} + \dfrac{3 \ddot{e}_{y0}}{2 t_f^2} - \dfrac{\ddot{e}_{yf}}{t_f^2} \\ -\dfrac{6 e_{y0}}{t_f^5} + \dfrac{6 e_{yf}}{t_f^5} - \dfrac{3 \dot{e}_{y0}}{t_f^4} - \dfrac{3 \dot{e}_{yf}}{t_f^4} - \dfrac{\ddot{e}_{y0}}{2 t_f^3} - \dfrac{\ddot{e}_{yf}}{2 t_f^3} \end{bmatrix} = \begin{bmatrix} c_1 \\ c_2 \\ c_3 \\ c_4 \\ c_5 \\ c_6 \\ d_1 \\ d_2 \\ d_3 \\ d_4 \\ d_5 \\ d_6 \end{bmatrix} \quad (11)$$

where $l_0$ is the initial arclength along the route, $l_f$ is the final arc length, $t_f$ is the final time, $e_{y,0}$ is an initial normal distance to the route, and $e_{y,f}$ is a final normal distance,.

Turning to FIG. 5B, at operation 528, example process 500 may comprise determining intermediation position(s) and/or a final position associated with the second candidate trajectory. For example, this may be based at least in part on determining the arc length and/or lateral distance at the end time, for the final position, and/or at an intermediate time for an intermediate position. This arc length and/or lateral distance may be used in conjunction with equations (5)-(8) to find the exact position. For example, a final position 530 associated with trajectory 526 is depicted in FIG. 5B.

At operation 532, example process 500 may comprise determining whether the second candidate trajectory satisfies an operating parameter. The operating parameter may include a rule such as a maximum jerk, maximum acceleration, legal speed limit, a rule that dictates how close the vehicle may pass by objects of a certain kind, whether the vehicle may cross into another lane, or the like. In some examples, the operating parameter may be determined based at least in part on sensor data, map data, or the like, such as a maximum velocity, whether the vehicle can cross into a lane associated with oncoming traffic, a minimum distance to remain from other objects (e.g., as vehicle speed increases, the distance may increase), or the like. Determining whether the second candidate trajectory may include determining whether a final position or intermediate position is closer to an object than a minimum distance to maintained from other vehicles, whether the second candidate trajectory is associated with a jerk and/or acceleration that meets or exceeds a maximum jerk and/or maximum acceleration, etc. In some examples, the second candidate trajectory may be checked against one or more operating parameters and the number of operating parameters may change based at least in part on a state of the vehicle (e.g., whether the vehicle is moving, how many or what kind of objects are present, whether teleoperations is activated).

If the second candidate trajectory does not satisfy the operating parameter, example process 500 may return to operation 524 and a new candidate trajectory may be generated.

If the second candidate trajectory satisfies the operating parameter(s), example process 500 may continue to operation 534.

At operation 534, example process 500 may comprise controlling the vehicle based at least in part on the second candidate trajectory. This may comprise causing motion of the vehicle to be controlled via instructions generated by one or more controllers of the vehicle based at least in part on the second candidate trajectory.

Example Clauses

A: A method comprising: receiving sensor data associated with operation of a vehicle in an environment; determining, based at least in part on the sensor data and a state of a set of states discretized based at least in part on one more of a displacement along or a lateral distance from a route, a first candidate trajectory; determining, as a switching criteria and based at least in part on at least one of the sensor data or map data, that a curvature associated with operating the vehicle in the environment meets or exceeds a threshold curvature; determining, based at least in part on the sensor data and the switching criteria, a second candidate trajectory based at least in part on an arc length; and controlling the vehicle based at least in part on the second candidate trajectory.

B: The method of paragraph A, wherein: determining the first candidate trajectory comprises: determining, based at least in part on the sensor data and the route, a first goal point, the first goal point indicating a displacement along the route and a lateral offset from the route; and determining first control instructions to reach the first goal point, and determining the second candidate trajectory comprises: determining, based at least in part on the sensor data and the route, a second goal point indicating the arc length; and determining second control instructions to accomplish a trajectory having the arc length.

C: The method of either paragraph A or B, further comprising: determining, based at least in part on the arc length, an estimated final position associated with the second candidate trajectory; determining, based at least in part on the second candidate trajectory, a set of controls indicating at least one of an acceleration or steering rate; determining, based at least in part on the set of controls, an actual final position associated with the second candidate trajectory; and determining that a distance between the actual final position and a goal point indicated by the route is less than a threshold distance, wherein controlling the vehicle based at least in part on the second candidate trajectory is based at least in part on determining that the distance is less than the threshold distance.

D: The method of paragraph C, further comprising determining that a second distance between the estimated final position and the goal point is less than the threshold distance.

E: The method of any one of paragraphs A-D, wherein the method further comprises: determining, based at least in part on a second arc length, a third candidate trajectory; determining an estimated final position associated with the third candidate trajectory; determining, based at least in part on the third candidate trajectory, a set of controls indicating at least one of an acceleration or steering rate; determining an actual final position based at least in part on the set of controls; determining that a distance between the actual final position and a goal point defined by the route meets or exceeds a threshold distance; and determining to determine a new candidate trajectory based at least in part on the distance meeting or exceeding the threshold distance, wherein the new candidate trajectory includes the second candidate trajectory.

F: The method of any one of paragraphs A-E, wherein the first candidate trajectory and the second candidate trajectory are determined based at least in part on closed loop control and the method further comprises: determining that a velocity associated with the first candidate trajectory or the second candidate trajectory is at or below a velocity threshold; and altering the trajectory generation component to conduct open loop control for controlling the vehicle at velocities below the velocity threshold.

G: The method of any one of paragraphs A-F, further comprising: determining, based at least in part on the first candidate trajectory and by a cost function, a first cost; determining, based at least in part on the second candidate trajectory and by the cost function, a second cost; and determining to control the vehicle based at least in part on determining that the second cost is less than the first cost.

H: A system comprising: one or more processors; and a memory storing processor-executable instructions that, when executed by the one or more processors, cause the system to perform operations comprising: receiving sensor data associated with operation of a vehicle in an environment; determining, based at least in part on the sensor data, a state space comprising multiple states, wherein a state of the multiple states is discretized based at least in part on an arc length and a lateral distance from a route; determining, based at least in part on the state, a first candidate trajectory based at least in part on the arc length; and controlling the vehicle based at least in part on the first candidate trajectory.

I: The system of paragraph H, wherein determining the first candidate trajectory comprises: determining, based at least in part on the sensor data and the route, a first goal point indicating the arc length; and determining control instructions to accomplish a trajectory having the arc length.

J: The system of either paragraph H or I, wherein the operations further comprise: determining, based at least in part on the arc length, an estimated final position associated with the first candidate trajectory; determining, based at least in part on the first candidate trajectory, a set of controls indicating at least one of an acceleration or steering rate; determining, based at least in part on the set of controls, an actual final position associated with the second candidate trajectory; and determining that a distance between the actual final position and a goal point indicated by the route is less than a threshold distance, wherein controlling the vehicle based at least in part on the second candidate trajectory is based at least in part on determining that the distance is less than the threshold distance.

K: The system of paragraph J, wherein the operations further comprise determining that a second distance between the estimated final position and the goal point is less than the threshold distance.

L: The system of any one of paragraphs H-K, wherein the operations further comprise: determining, based at least in part on a second arc length, a second candidate trajectory; determining an estimated final position associated with the second candidate trajectory; determining, based at least in part on the second candidate trajectory, a set of controls indicating at least one of an acceleration or steering rate; determining an actual final position based at least in part on the set of controls; determining that a distance between the actual final position and a goal point defined by the route meets or exceeds a threshold distance; and determining to determine a new candidate trajectory based at least in part on the distance meeting or exceeding the threshold distance, wherein the new candidate trajectory includes the first candidate trajectory.

M: The system of any one of paragraphs H-L, wherein the first candidate trajectory is determined based at least in part on closed loop control and the operations further comprise: determining that a velocity associated with the first candidate trajectory is at or below a velocity threshold; and altering the trajectory generation component to conduct open loop control for controlling the vehicle at velocities below the velocity threshold.

N: The system of any one of paragraphs H-M, wherein the operations further comprise: determining a second candidate trajectory based at least in part on a displacement along a route and a lateral distance from the route; determining, based at least in part on the first candidate trajectory and by a cost function, a first cost; determining, based at least in part on the second candidate trajectory and by the cost function, a second cost; and determining to control the vehicle based at least in part on determining that the first cost is less than the second cost.

O: A non-transitory computer-readable medium storing processor-executable instructions that, when executed by one or more processors, cause one or more processors to perform operations comprising: receiving sensor data associated with operation of a vehicle in an environment; determining, based at least in part on the sensor data, a state space comprising multiple states, wherein a state of the multiple states is discretized based at least in part on an arc length and a lateral distance from a route; determining, based at least in part on the state, a first candidate trajectory based at least in part on the arc length; and controlling the vehicle based at least in part on the first candidate trajectory.

P: The non-transitory computer-readable medium of paragraph O, wherein determining the first candidate trajectory comprises: determining, based at least in part on the sensor data and the route, a first goal point indicating the arc length; and determining control instructions to accomplish a trajectory having the arc length.

Q: The non-transitory computer-readable medium of either paragraph O or P, wherein the operations further comprise: determining, based at least in part on the arc length, an estimated final position associated with the first candidate trajectory; determining, based at least in part on the first candidate trajectory, a set of controls indicating at least one of an acceleration or steering rate; determining, based at least in part on the set of controls, an actual final position associated with the second candidate trajectory; and determining that a distance between the actual final position and a goal point indicated by the route is less than a threshold distance, wherein controlling the vehicle based at least in part on the second candidate trajectory is based at least in part on determining that the distance is less than the threshold distance.

R: The non-transitory computer-readable medium of any one of paragraphs O-Q, wherein the operations further comprise: determining, based at least in part on a second arc length, a second candidate trajectory; determining an estimated final position associated with the second candidate trajectory; determining, based at least in part on the second candidate trajectory, a set of controls indicating at least one of an acceleration or steering rate; determining an actual final position based at least in part on the set of controls; determining that a distance between the actual final position and a goal point defined by the route meets or exceeds a threshold distance; and determining to determine a new candidate trajectory based at least in part on the distance meeting or exceeding the threshold distance, wherein the new candidate trajectory includes the first candidate trajectory.

S: The non-transitory computer-readable medium of any one of paragraphs O-R, wherein the first candidate trajectory is determined based at least in part on closed loop control and the operations further comprise: determining that a velocity associated with the first candidate trajectory is at or below a velocity threshold; and altering the trajectory generation component to conduct open loop control for controlling the vehicle at velocities below the velocity threshold.

T: The non-transitory computer-readable medium of any one of paragraphs O-S, wherein the operations further comprise: determining a second candidate trajectory based at least in part on a displacement along a route and a lateral distance from the route; determining, based at least in part on the first candidate trajectory and by a cost function, a first cost; determining, based at least in part on the second candidate trajectory and by the cost function, a second cost; and determining to control the vehicle based at least in part on determining that the first cost is less than the second cost.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow graphs, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art. Note that the term substantially may indicate a range. For example, substantially simultaneously may indicate that two activities occur within a time range of each other, substantially a same dimension may indicate that two elements have dimensions within a range of each other, and/or the like.

Many variations and modifications may be made to the above-described examples, the elements of which are to be understood as being among other acceptable examples. All such modifications and variations are intended to be included herein within the scope of this disclosure and protected by the following claims.

What is claimed is:

1. A method comprising:
   receiving sensor data associated with operation of a vehicle in an environment;
   determining, based at least in part on the sensor data and a state of a set of states discretized based at least in part on one or more of a displacement along or a lateral distance from a route, a first candidate trajectory;
   determining, based at least in part on at least one of the sensor data or map data, that a curvature associated with operating the vehicle in the environment meets or exceeds a threshold curvature;
   altering a trajectory generation component based at least in part on determining that the curvature meets or exceeds a threshold curvature, wherein altering the trajectory generation component comprises determining, based at least in part on an arc length and the sensor data, a second candidate trajectory; and
   controlling the vehicle based at least in part on the second candidate trajectory.

2. The method of claim 1, wherein:
   determining the first candidate trajectory comprises:
      determining, based at least in part on the sensor data and the route, a first goal point, the first goal point indicating a displacement along the route and a lateral offset from the route; and
      determining first control instructions to reach the first goal point, and determining the second candidate trajectory comprises:
      determining, based at least in part on the sensor data and the route, a second goal point indicating the arc length; and
      determining second control instructions to accomplish a trajectory having the arc length.

3. The method of claim 1, further comprising:
   determining, based at least in part on the arc length, an estimated final position associated with the second candidate trajectory;
   determining, based at least in part on the second candidate trajectory, a set of controls indicating at least one of an acceleration or steering rate;
   determining, based at least in part on the set of controls, an actual final position associated with the second candidate trajectory; and
   determining that a distance between the actual final position and a goal point indicated by the route is less than a threshold distance,
   wherein controlling the vehicle based at least in part on the second candidate trajectory is based at least in part on determining that the distance is less than the threshold distance.

4. The method of claim 3, further comprising determining that a second distance between the estimated final position and the goal point is less than the threshold distance.

5. The method of claim 1, wherein the method further comprises:
   determining, based at least in part on a second arc length, a third candidate trajectory;
   determining an estimated final position associated with the third candidate trajectory;
   determining, based at least in part on the third candidate trajectory, a set of controls indicating at least one of an acceleration or steering rate;
   determining an actual final position based at least in part on the set of controls;
   determining that a distance between the actual final position and a goal point defined by the route meets or exceeds a threshold distance; and
   determining to determine a new candidate trajectory based at least in part on the distance meeting or exceeding the threshold distance, wherein the new candidate trajectory includes the second candidate trajectory.

6. The method of claim 1, wherein the first candidate trajectory and the second candidate trajectory are determined based at least in part on closed loop control and the method further comprises:
   determining that a velocity associated with the first candidate trajectory or the second candidate trajectory is at or below a velocity threshold; and
   altering the trajectory generation component to conduct open loop control for controlling the vehicle at velocities below the velocity threshold.

7. The method of claim 1, further comprising:
   determining, based at least in part on the first candidate trajectory and by a cost function, a first cost;
   determining, based at least in part on the second candidate trajectory and by the cost function, a second cost; and
   determining to control the vehicle based at least in part on determining that the second cost is less than the first cost.

8. A system comprising:
   one or more processors; and
   a memory storing processor-executable instructions that, when executed by the one or more processors, cause the system to perform operations comprising:
      receiving sensor data associated with operation of a vehicle in an environment;
      determining, based at least in part on the sensor data, a state space comprising multiple states, wherein a state of the multiple states is discretized based at least in part on an arc length and a lateral distance from a route;
      determining, based at least in part on the state, a first candidate trajectory based at least in part on the arc length; and
      controlling the vehicle based at least in part on the first candidate trajectory.

9. The system of claim 8, wherein determining the first candidate trajectory comprises:
   determining, based at least in part on the sensor data and the route, a first goal point indicating the arc length; and
   determining control instructions to accomplish a trajectory having the arc length.

10. The system of claim 8, wherein the operations further comprise:
    determining, based at least in part on the arc length, an estimated final position associated with the first candidate trajectory;
    determining, based at least in part on the first candidate trajectory, a set of controls indicating at least one of an acceleration or steering rate;
    determining, based at least in part on the set of controls, an actual final position associated with the first candidate trajectory; and
    determining that a distance between the actual final position and a goal point indicated by the route is less than a threshold distance,
    wherein controlling the vehicle based at least in part on the first candidate trajectory is based at least in part on determining that the distance is less than the threshold distance.

11. The system of claim 10, wherein the operations further comprise determining that a second distance between the estimated final position and the goal point is less than the threshold distance.

12. The system of claim 8, wherein the operations further comprise:
    determining, based at least in part on a second arc length, a second candidate trajectory;
    determining an estimated final position associated with the second candidate trajectory;
    determining, based at least in part on the second candidate trajectory, a set of controls indicating at least one of an acceleration or steering rate;
    determining an actual final position based at least in part on the set of controls;
    determining that a distance between the actual final position and a goal point defined by the route meets or exceeds a threshold distance; and
    determining to determine a new candidate trajectory based at least in part on the distance meeting or exceeding the threshold distance, wherein the new candidate trajectory includes the first candidate trajectory.

13. The system of claim 8, wherein the first candidate trajectory is determined based at least in part on closed loop control and the operations further comprise:
    determining that a velocity associated with the first candidate trajectory is at or below a velocity threshold; and
    altering a trajectory generation component to conduct open loop control for controlling the vehicle at velocities below the velocity threshold.

14. The system of claim 8, wherein the operations further comprise:
    determining a second candidate trajectory based at least in part on a displacement along a route and a lateral distance from the route;
    determining, based at least in part on the first candidate trajectory and by a cost function, a first cost;
    determining, based at least in part on the second candidate trajectory and by the cost function, a second cost; and
    determining to control the vehicle based at least in part on determining that the first cost is less than the second cost.

15. A non-transitory computer-readable medium storing processor-executable instructions that, when executed by one or more processors, cause the one or more processors to perform operations comprising:
    receiving sensor data associated with operation of a vehicle in an environment;
    determining, based at least in part on the sensor data, a state space comprising multiple states, wherein a state of the multiple states is discretized based at least in part on an arc length and a lateral distance from a route;

determining, based at least in part on the state, a first candidate trajectory based at least in part on the arc length; and controlling the vehicle based at least in part on the first candidate trajectory.

16. The non-transitory computer-readable medium of claim 15, wherein determining the first candidate trajectory comprises:

determining, based at least in part on the sensor data and the route, a first goal point indicating the arc length; and determining control instructions to accomplish a trajectory having the arc length.

17. The non-transitory computer-readable medium of claim 15, wherein the operations further comprise:

determining, based at least in part on the arc length, an estimated final position associated with the first candidate trajectory;

determining, based at least in part on the first candidate trajectory, a set of controls indicating at least one of an acceleration or steering rate;

determining, based at least in part on the set of controls, an actual final position associated with the first candidate trajectory; and determining that a distance between the actual final position and a goal point indicated by the route is less than a threshold distance, wherein controlling the vehicle based at least in part on the first sesond candidate trajectory is based at least in part on determining that the distance is less than the threshold distance.

18. The non-transitory computer-readable medium of claim 15, wherein the operations further comprise:

determining, based at least in part on a second arc length, a second candidate trajectory;

determining an estimated final position associated with the second candidate trajectory;

determining, based at least in part on the second candidate trajectory, a set of controls indicating at least one of an acceleration or steering rate;

determining an actual final position based at least in part on the set of controls;

determining that a distance between the actual final position and a goal point defined by the route meets or exceeds a threshold distance; and determining to determine a new candidate trajectory based at least in part on the distance meeting or exceeding the threshold distance, wherein the new candidate trajectory includes the first candidate trajectory.

19. The non-transitory computer-readable medium of claim 15, wherein the first candidate trajectory is determined based at least in part on closed loop control and the operations further comprise:

determining that a velocity associated with the first candidate trajectory is at or below a velocity threshold; and altering a trajectory generation component to conduct open loop control for controlling the vehicle at velocities below the velocity threshold.

20. The non-transitory computer-readable medium of claim 15, wherein the operations further comprise:

determining a second candidate trajectory based at least in part on a displacement along a route and a lateral distance from the route;

determining, based at least in part on the first candidate trajectory and by a cost function, a first cost;

determining, based at least in part on the second candidate trajectory and by the cost function, a second cost; and determining to control the vehicle based at least in part on determining that the first cost is less than the second cost.

* * * * *